United States Patent [19]

Lautzenhiser

[11] 4,215,578

[45] Aug. 5, 1980

[54] DIPOLE MASS LASER-BASED GRAVITY GRADIOMETER

[75] Inventor: Theodore V. Lautzenhiser, Tulsa, Okla.

[73] Assignee: Standard Oil Company (Indiana), Chicago, Ill.

[21] Appl. No.: 39,409

[22] Filed: May 15, 1979

Related U.S. Application Data

[63] Continuation of Ser. No. 910,971, May 30, 1978, abandoned.

[51] Int. Cl.² .............................................. G01V 7/12
[52] U.S. Cl. .................................. 73/382 G; 73/432 L
[58] Field of Search ............ 73/382 R, 382 G, 517 R., 73/517 B, 516 R, 432 L; 331/DIG. 1; 332/7.51; 350/149; 356/33, 106 LR

[56] References Cited

U.S. PATENT DOCUMENTS

| 3,114,264 | 12/1963 | Williamson | 73/382 G |
| 3,517,560 | 6/1970 | Jacobs et al. | 73/517 R X |
| 3,714,607 | 1/1973 | Cutler | 356/106 RL X |
| 3,786,681 | 1/1974 | Kiehn | 73/517 R X |
| 3,800,594 | 4/1974 | Hutching et al. | 73/517 R X |

Primary Examiner—Charles A. Ruehl
Attorney, Agent, or Firm—James H. Dautremont

[57] ABSTRACT

A gravity gradiometer using at least one mass dipole mounted in a laser force-measurement system to detect the torque on the mass dipole generated by gravity gradient. The mass dipole is mounted on one end of a photoelastic modulator element positioned in the laser beam to differentially modulate circular polarization modes in response to application of a torque. In a preferred form, two mass dipoles are mounted on opposite ends of the modulator element which is rigidly supported at its center to improve noise rejection.

15 Claims, 1 Drawing Figure

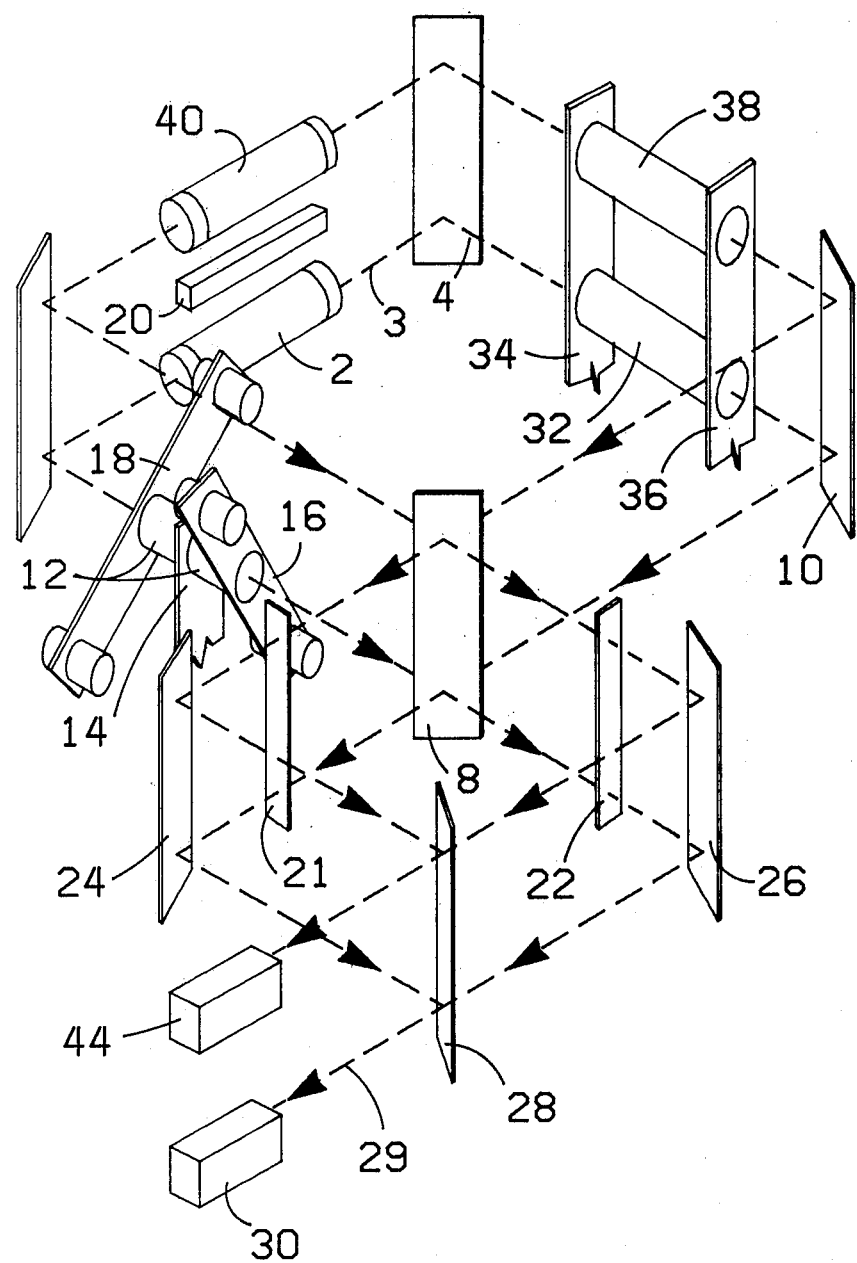

DIPOLE MASS LASER-BASED GRAVITY GRADIOMETER

This application is a continuation of a U.S. patent application with the same title, Ser. No. 910,971, filed on May 30, 1978, now abandoned.

BACKGROUND OF THE INVENTION

This invention relates to laser-based gravity gradiometers and more particularly to a gravity gradiometer in which the torque caused by gravity gradient on a mass dipole is sensed by a laser force-measurement device.

The prior art believed to be most relevant to the present invention is U.S. Pat. No. 3,786,681, issued to Keihn, on Jan. 22, 1974, and entitled "Electromagnetic Wave Modulation and Measurement System and Method." The preferred embodiment disclosed by the patent includes a ring laser having a plurality of circular polarization modes and a modulator element within the laser cavity which produces differential frequency shifts between the polarization modes in response to application of a torque. One use taught for such a device is a gravity meter in which the force of gravity on a known mass is converted to a torque by being attached to the modulator element by means of a lever arm. Such a device is suggested for use in a borehole for measuring the earth's gravity. As is well known and as is taught in the patent, such a device is also an accelerometer and responds to any acceleration of the measuring instrument. Thus, to measure gravity at location in the borehole, the measuring device must be stationary for a time period long enough to allow the device to stabilize. It would be much more advantageous to have a gravity-measuring device which would allow the required gravity measurements to be taken while the device is moved through the borehole.

In normal gravity meter borehole logging, the parameter of most importance is the difference in gravity at known, closely spaced locations in the borehole, that is, the gravity gradient over short intervals. Gravity gradiometers of various types are well known in the art but have not been used in a borehole due to their large size, sensitivity to motion, and long settling times. One form of such gravity gradiometer involves mass dipole suspended at a 45° angle relative to the direction of the gravity gradient to be measured. It is known that a gravity gradient which is neither parallel nor perpendicular to the axis of the mass dipole will exert a small torque on the mass dipole. Horizontal gradients have been detected by supporting the dipole on a fine filament which allows the dipole to turn slightly in response to a gradient. Other efforts have been made to support the dipole on a bearing, ideally frictionless, which would allow the dipole to rotate in response to the torque with the rotation, and therefore the torque, being sensed by electrostatic sensors. As a result, most of these systems have been either very complicated or fragile and tend to have very long settling times so that their use in the borehole would still require stationary reading, and, therefore, long time periods in which the borehole must be out of use.

SUMMARY OF THE INVENTION

Accordingly, an object of the present invention is to provide an improved gravity gradiometer suitable for use in a borehole.

A gravity gradiometer according to the present invention comprises at least one mass dipole connected to a photoelastic modulator element positioned within a laser cavity in which circular polarization modes are differentially modulated by the application of a torque to the modulator element. Means are provided for detecting the beat frequency between the circular polarization modes and providing an output indicating the beat frequency, and, therefore, the level of gravity gradient.

BRIEF DESCRIPTION OF THE DRAWING

The present invention may be more fully understood by reading the following description of the preferred embodiments with reference to the attached drawing which illustrates a gravity gradiometer according to the present invention.

DESCRIPTION OF THE PREFERRED EMBODIMENT

The drawing illustrates a gravity gradiometer according to the present invention in essentially the same way as illustrated in the above-referenced U.S. Pat. No. 3,786,681. A laser amplifier tube 2 generates a laser beam indicated by the dotted line 3. The beam 3 travels mainly within the cavity formed by mirrors 4, 6, 8, and 10. Mirror 8 is partially transmissive to allow a portion of the beam to pass to a beat detection portion of the system more fully described below. A modulator element 12, comprising a quartz rod, is bonded at its center to a rigid support 14 which is part of the housing containing the gradiometer system. Bonded to a first end of the quartz rod 12 is a first mass dipole 16 comprising, as illustrated, two masses connected by a beam. A second substantially identical mass dipole 18 is connected to the opposite end of the modulator element 12. The dipoles, as illustrated, are positioned at substantially right angles to each other. Also illustrated as part of the basic system is a bar magnet 20 positioned near amplifier tube 2 to insure the production of circular polarization modes. Other known means for generating circular polarization may be used instead.

As stated in the background of the invention section, it is known that a gravity gradient which has a direction neither parallel nor perpendicular to the axis of a mass dipole, such as dipoles 16 or 18, will generate a torque in that dipole. The mass dipoles illustrated in the figure will respond to vertical and horizontal gravity gradients in the plane perpendicular to the axis of element 12 but not to those parallel to either beam of the two mass dipoles 16 and 18. In the drawing, a vertical gravity gradient which would tend to rotate dipole 16 clockwise would at the same time try to rotate dipole 18 counterclockwise. As a result, the torques are symmetrical and the differential modulation of the circular polarization modes of the laser beam are additive. It can be seen, therefore, that it is not essential that both dipoles as illustrated be employed. For given masses and element dimensions, half of the same signal could be derived by using a single dipole connected to one end of the modulator rod 12. The dual dipole arrangement is preferred because it provides larger signal and, most importantly, because it eliminates sources of noise such as rotational acceleration of the device about the axis of the laser beam passing through modulator element 12.

Since the dipoles 16 and 18 are rigidly attached to the quartz rod 12, the only motion which the dipoles experience is that allowed by the elasticity of the quartz rod in response to the torque applied to it. As a result, the settling time of this arrangement is extremely short and the device is very rugged so that it is ideally suited for use in borehole exploratory work.

In use, the torque applied to the dipole or pair of dipoles causes a differential change in the frequency of the circular polarization modes and a portion of the laser beam 3 passes through mirror 8 to the beat detection portion of the system. In a preferred form, this beat detection portion includes polarizers 21 and 22, mirrors 24 and 26, and a beam splitter 28 for recombining the beams for mirrors 24 and 26. The recombined beam indicated by numeral 29 passes to a beat detector 30 for providing an electrical output indicating the frequency difference between the beam directed to it. This electrical output is therefore an indication of the gravity gradient to which the dipoles 16 and 18 have been exposed.

It is noted in the above-referenced U.S. Pat. No. 3,786,681 that this type of force-measurement system has a nonlinear region caused by phase locking near the zero beat frequency. It can be seen that the gravity gradients experienced by mass dipoles 16 and 18 will be rather small and will generate small torques in the modulator 12 and thus will result in operation nearer the zero beat frequency point. As a result, it is preferred that a biasing element be provided in the laser cavity for moving the normal operating point away from the zero beat frequency level. This element 32 is a quartz rod similar to the modulator element 12. Rod 32 is pre-torqued and bonded to rigid supports 34 and 36 which resist the torque and thereby maintain the element in a constant torque condition. As a result, bias element 32 produces a steadystate frequency difference between the various polarization modes of the laser beam 3. The output of beat detector 30 is then equal to the signal produced by modulator 12 plus the bias level set by element 32.

To maintain the bias level of element 32 essentially constant under all environmental conditions, it is preferred that the torque applied to element 32 be supplied by means of a stressing element 38 made of the same material and of essentially identical dimensions. As illustrated in the figure, stressing element 38 is also bonded to supports 34 and 36 so that if one of the supports 34 or 36 is free-floating, the torque in stressing element 32 is equal in magnitude but opposite in sense to that experienced by biasing element 32. Since both elements are made of the identical material and experience the same conditions, they should respond symmetrically to, for example, temperature changes to maintain a constant torque in both elements.

While amorphous quartz is the preferred material from which elements 12, 32, and 38 are made, it is clear that other materials may be substituted. As noted in U.S. Pat. No. 3,786,681, other photoelastic materials which exhibit force-responsive birefringent effects may also be used.

For the best precision, it is important to know whether the bias level generated by element 32 changes at all during the taking of gravity gradient readings. This can be accomplished by the further addition of a second ring laser cavity having a laser beam passing through stressing element 38. The second ring laser comprises a second laser amplifier tube 40 and the mirrors 4, 6, 8, and 10. The same magnet 20 can be arranged to provide a magnetic field for amplifier tube 40 or other means of insuring circular polarization can be provided. The laser beam 42 generated by amplifier tube 40 passes through stressing element 38 but is otherwise unaffected by any modulating element which could differentially vary the frequency of the circular polarization modes. As a result, the beat frequency induced by stressing element 38 in beam 42 is a direct indication of the bias level produced in beam 3 by bias element 32. A portion of laser beam 42 passes from the ring laser cavity through mirror 8 to a beat detection section. This section comprises the polarizers 21 and 22, mirrors 24 and 26, beam splitter 28, and a second beat detector 44. The electrical output of beat detector 44 is therefore an indication of bias level provided by biasing element 32.

The output of beat detector 44 may be used in several ways. If the output of beat detector 30 is recorded on a stripchart recorder or possibly on magnetic tape, the output of beat detector 44 may be recorded as a second trace on the stripchart recorder or a second track on magnetic tape. This would allow comparison of the bias level to the signal output so that any changes in the bias level could be taken into consideration in analyzing the signal. Alternatively, the output of beat detector 44 could be subtracted from the output of beat detector 30 to provide a single corrected output which indicates only the desired gradient signal.

Since the reflecting mirrors can be used for both ring lasers with very little increase in size, only a small amount of additional equipment is needed to add the monitoring ring laser. It would be possible to pass the beam 42 through biasing element 32 itself without interfering with beam 3. This can be done either by physical separation of the paths of beams 3 and 42 through element 32 or by use of different frequencies for beams 3 and 42 with separation accomplished by filters. The arrangement illustrated in the drawing is believed to be more practical and is therefore preferred.

The monitor system is not essential to operation of the laser gravity gradiometer and can be used only for calibration of the system if desired. In addition, the monitor system may be used during qualification of the device for a particular environment and may be eliminated if the results show that the biasing element 32 provides a stable bias level. It will be preferred in essentially all cases to use a stressing element 38 made of the same material and of essentially identical dimensions to bias element 32 so that the bias level will be as stable as possible.

It is believed that the best way to improve the ruggedness of a gravity gradiometer according to the present invention will be to construct most of the elements illustrated in the drawing from or within a solid section of quartz. Such an assembly method is illustrated in FIGS. 3a and 3b of U.S. Pat. No. 3,517,560, issued to Jacobs, et al., on June 30, 1970. Such a construction method reduces the number of gas-to-solid interfaces through which the laser beam must pass.

While the present invention has been shown and illustrated in terms of specific apparatus, it is apparent that other variations and modifications can be made within the scope of the present invention as defined by the appended claims.

What is claimed is:

1. A gravity gradiometer comprising:
   a laser for generating a laser beam having a plurality of circular polarization modes;
   a modulator comprising a photoelastic element positioned in the path of the laser beam for differentially altering the characteristics of the polarization modes in response to the application of a stress, said modulator fixedly supported at its center relative to the path of the laser beam;

first and second mass dipoles bonded to first and second ends of the modulator, said dipoles positioned at substantially right angles to each other, whereby a gravity gradient in a plane perpendicular to the path of the laser beam produces torques in said mass dipoles which are coupled to said modulator to produce a frequency difference between said modes; and means for detecting said frequency difference.

2. A gravity gradiometer according to claim 1 in which said laser includes a laser tube and at least three reflectors forming a ring laser cavity for said tube.

3. A gravity gradiometer according to claim 1 in which said laser includes a gas laser tube.

4. A gravity gradiometer according to claim 1 further including a biasing element positioned within the path of the laser beam, said biasing element consisting of photoelastic material pre-stressed by application of a permanent torque wherein the axis of the torque is parallel to the axis of the laser beam, whereby said biasing element causes an essentially constant frequency difference between the polarization modes in addition to that caused by said modulator and causes said gradiometer to operate in a linear response range.

5. A gravity gradiometer according to claim 4 wherein said biasing element is pre-stressed by being permanently bonded to a stressing element consisting of photoelastic material and further including a second laser for generating a second laser beam having a plurality of circular polarization modes positioned so that said second laser beam passes through said stressing element along the axis of the torque applied to said torqueing element, so that said torque produces a frequency difference between said modes, and also further including second means for detecting the frequency difference between the modes of said second beam.

6. A gravity gradiometer according to claim 4 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

7. A gravity gradiometer comprising:
a laser for generating a laser beam having a plurality of circular polarization modes;
a modulator comprising a photoelastic element positioned in the path of the laser beam for differentially altering the characteristics of the polarization modes in response to the application of a stress, said modulator being fixedly supported at a first end relative to the path of the laser beam;
a mass dipole bonded to a second end of the modulator with the axis of the dipole perpendicular to the path of the laser beam whereby a gravity gradient in the plane perpendicular to the laser beam produces a torque in the dipole which is coupled to the modulator to produce a frequency difference between said modes;
means for detecting said frequency difference; and
a biasing element positioned within the path of the laser beam, said biasing element comprising photoelastic material pre-stressed by application of a permanent torque wherein the axis of the torque is parallel to the axis of the laser beam, whereby said biasing element causes an essentailly constant frequency difference between the polarization modes in addition to that caused by said modulator and causes said gradiometer to operate in a linear response range.

8. A gravity gradiometer according to claim 7 wherein said biasing element is pre-stressed by being permanently bonded to a stressing element consisting of photoelastic material and further including a second laser for generating a second laser beam having a plurality of circular polarization modes positioned so that said second laser beam passes through said stressing element along the axis of said modulator, so that said torque produces a frequency difference between said modes, and also further including second means for detecting the frequency difference between the modes of said second laser beam.

9. A gravity gradiometer according to claim 7 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

10. A method for determining gravity gradients comprising the steps of:
generating a laser beam having a plurality of circular polarization modes;
positioning a modulator comprising a photoelastic element in the path of said laser beam for differentially altering the characteristics of the polarization modes in response to the application of a stress, said modulator being fixedly supported at its center relative to the path of said laser beam;
attaching first and second mass dipoles to first and second ends of said modulator, said dipoles being positioned at substantially right angles to each other, whereby a gravity gradient in a plane perpendicular to the path of said laser beam will produce torques on said mass dipoles which are coupled to said modulator, thus producing a frequency difference between said modes;
detecting said frequency difference.

11. The method of claim 10, including the step of employing at least three reflectors and a laser tube to form a ring laser cavity to generate said laser beam.

12. The method of claim 11, wherein said laser tube comprises a gas laser tube.

13. The method of claim 10, including the step of positioning a biasing element within the path of said laser beam, said biasing element comprising photoelastic material pre-stressed by application of a permanent torque wherein the axis of the torque is parallel to the axis of the laser beam, whereby said biasing element causes an essentially constant frequency difference between said polarization modes in addition to that caused by said modulator, thus causing said method to provide a linear response to said gravity gradients.

14. A method for determining gravity gradients comprising the steps of:
generating a laser beam having a plurality of circular polarization modes;
positioning a modulator comprising a photoelastic element in the path of said laser beam for differentially altering the characteristics of the polarization modes in response to the application of a stress, said modulator being fixedly supported at a first end relative to the path of said laser beam;

attaching a mass dipole to a second end of said modulator with the axis of said dipole being perpendicular to the path of said laser beam, whereby a gravity gradient in the plane perpendicular to said laser beam produces a torque in the dipole which is coupled to the modulator to produce a gravity gradient caused frequency difference between said modes;

positioning a biasing element within the path of said laser beam, said biasing element comprising photoelastic material pre-stressed by application of a permanent torque wherein the axis of said torque is parallel to the axis of said laser beam, whereby said biasing element causes an essentially constant frequency difference between the polarization modes in addition to that caused by said modulator and causes said method to provide a linear response to said gravity gradients; and detecting said gravity gradient caused frequency difference.

15. The methods of claims 10, or 11, or 12, or 13, or 14, wherein said methods are employed for determining gravity gradients in boreholes.

* * * * *